United States Patent
Cho et al.

(10) Patent No.: US 7,139,041 B2
(45) Date of Patent: Nov. 21, 2006

(54) DISPLAY APPARATUS

(75) Inventors: Nam-ill Cho, Suwon (KR); Young-tae Kim, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 859 days.

(21) Appl. No.: 10/102,877

(22) Filed: Mar. 22, 2002

(65) Prior Publication Data

US 2003/0001980 A1    Jan. 2, 2003

(30) Foreign Application Priority Data

Jun. 27, 2001   (KR)   ................................ 2001-37072

(51) Int. Cl.
*H04N 5/64*   (2006.01)
(52) U.S. Cl. ...................... 348/836; 348/832
(58) Field of Classification Search ................ 348/832, 348/836, 841, 818, 823, 824, 826; 312/7.2, 312/223.1, 223.2; *H04N 5/64, 5/72, 5/645, H04N 5/65*
See application file for complete search history.

(56) References Cited

U.S. PATENT DOCUMENTS

| | | | | | |
|---|---|---|---|---|---|
| 5,363,150 | A | * | 11/1994 | Kojima ........................ | 348/836 |
| 5,565,934 | A | * | 10/1996 | Boudreau et al. ........... | 348/818 |
| 5,592,241 | A | * | 1/1997 | Kita et al. ................... | 348/823 |
| 5,742,360 | A | * | 4/1998 | Kwon et al. ................. | 348/839 |
| 5,934,772 | A | * | 8/1999 | Sung ........................... | 312/7.2 |

* cited by examiner

*Primary Examiner*—Sherrie Hsia
(74) *Attorney, Agent, or Firm*—Robert E. Bushnell, Esq.

(57) ABSTRACT

A display apparatus is provided that includes: a display part including a panel with an effective face on which a picture is displayed, and a supporting face extending along a circumference of the effective face; a rear cover provided at the rear of the panel and surrounding the rear cover; and a front cover including an opening through which the effective face of the panel is exposed to the outside of the display apparatus, a front part contacting with and being supported by the supporting face of the panel, and a skirt part extending from each side of the front part toward the rear cover and being combined to the rear cover. With this configuration, such display apparatus provides a panel that is conspicuous for flatness in appearance.

31 Claims, 8 Drawing Sheets

DISPLAY APPARATUS

CLAIM OF PRIORITY

This application makes reference to, incorporates the same herein, and claims all benefits accruing under 35 U.S.C. § 119 from the application DISPLAYING APPARATUS filed with the Korean Industrial Property Office on Jun. 27, 2001 and there duly assigned Ser. No. 2001-37072.

BACKGROUND OF THE INVENTION

1. Field of the Invention

The present invention relates in general to a display apparatus, and more particularly, to a display apparatus including an improved structure of a front cover for a display apparatus.

2. Description of the Related Art

A display apparatus collectively refers to monitors for television (TV) sets or computer systems, and includes a CRT (cathode ray tube) monitor, an LCD (liquid crystal display) monitor, etc.

The CRT monitor employs the principle that when various electron beams according to the intensity of picture signals strikes a monochrome or RGB (red, green, blue) fluorescent material coated on a CRT panel, light having different brightness and various colors is generated. The CRT monitor is widely used because of an economic price and a good display quality, but it occupies a relatively large space being of a bulky size.

The LCD monitor employs the principle that when a predetermined voltage is supplied to a liquid crystal, a molecular arrangement of the liquid crystal is varied so as to prevent light from passing therethrough. The LCD monitor typically is thin in its thickness, but is expensive in price and can be relatively poor in display quality, in comparison with the CRT monitor.

A conventional display apparatus typically includes a cathode ray tube unit, and front and rear covers that are combined with each other and surround a cathode ray tube unit. The cathode ray tube unit includes a panel fitted to a front cover, a funnel combined with the panel, an electron gun inserted into a neck of the funnel and emitting an electron beam onto the panel, and a video unit transmitting a video signal. The panel has an effective face or display screen on which a picture is displayed, and a supporting face extending along a circumference or perimeter of the effective face and supporting an end part of a bending part of the front cover. At the front cover is provided an opening through which the effective face is exposed to the outside. The front cover includes a front part covering the supporting face, and a skirt part extending from each side of the front part toward the rear cover and being combined to the rear cover.

The front part and the skirt part are relatively thick and almost equal to each other in thickness. At an end part of the front part is provided the bending part inclined toward the panel. When the front cover is fastened on the cathode ray tube unit by combining using combination parts provided at a circumference or perimeter of the panel, such as with female screw-bosses provided at the front cover by means of male screws, the bending part prevents the front cover from coming off the effective face of the panel. The end part of the bending part is placed on the border between the effective face and the supporting face. The bending part creates a relatively wide stair difference between the front surface of the front part and the effective face.

However, in the conventional display apparatus, because not only the front part and the skirt part forming the front cover are relatively thick but also the bending part creates a relatively large stair difference between the front surface of the front part and the surface of the panel, it typically generates an appearance that the flatness of the panel is degraded. Particularly, in the case that the display apparatus is manufactured with a planar panel and not a spherical panel, the flatness of the panel can appear degraded more significantly, because of the large stair difference.

Further, if the display screen or effective face of the display apparatus is oblique in appearance, an area between the effective face of the panel and the front part maybe not shown.

SUMMARY OF THE INVENTION

Accordingly, the present invention has been made keeping in mind the above-described user's needs, and an object, among other objects, of the present invention is to provide a display apparatus in which the flatness of a panel is conspicuous in appearance.

The above and other objects of the present invention can be accomplished by a display apparatus, including: a display part including a panel including display screen or an effective face on which a picture is displayed, and a supporting face extending along a perimeter of the display screen; a rear cover provided at a rear of the panel and surrounding the rear of the panel; and a front cover including an opening or aperture through which the effective factor display screen of the panel is exposed to outside of the display apparatus, a front part contacting with and being supported by the supporting face of the panel, and a skirt part extending from each side of the front part toward the rear cover and being combined with the rear cover.

Preferably, the front part of the display apparatus includes a connection part bent inwardly from the skirt part, the connection part being of a predetermined thickness, and a contact part extending from the connection part and contacting with the supporting face, the contact part being thinner in thickness than the connection part.

Between the contact part and the connection part of the front part of the display apparatus is desirably provided a gradient part of the front part integrally formed with the contact part and the connection part. Where the contact part and the connection part are integrally formed, the gradient part prevents the relatively thin contact part from being broken. Thus, it is desirable that the gradient part includes a curved surface corresponding to a curvature of an edge of the panel.

Alternatively, the contact part of the front part is separable from the connection part of the front part. Thus, at a front of the connection part is formed a recess part located toward the rear cover, and at an inner edge of the recess part is formed a curved surface corresponding to a curvature of the edge of the panel.

Further, the contact part can be coupled to the recess part by means of a combining member, such as a double-sided tape.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENTS

Hereinbelow, preferred embodiments of the present invention will be described in more detail with reference to the accompanying drawings. Here, like elements among various preferred embodiments will differ in only a reference number, and therefore repetitive detailed descriptions thereof will be avoided as necessary.

Figure 1:
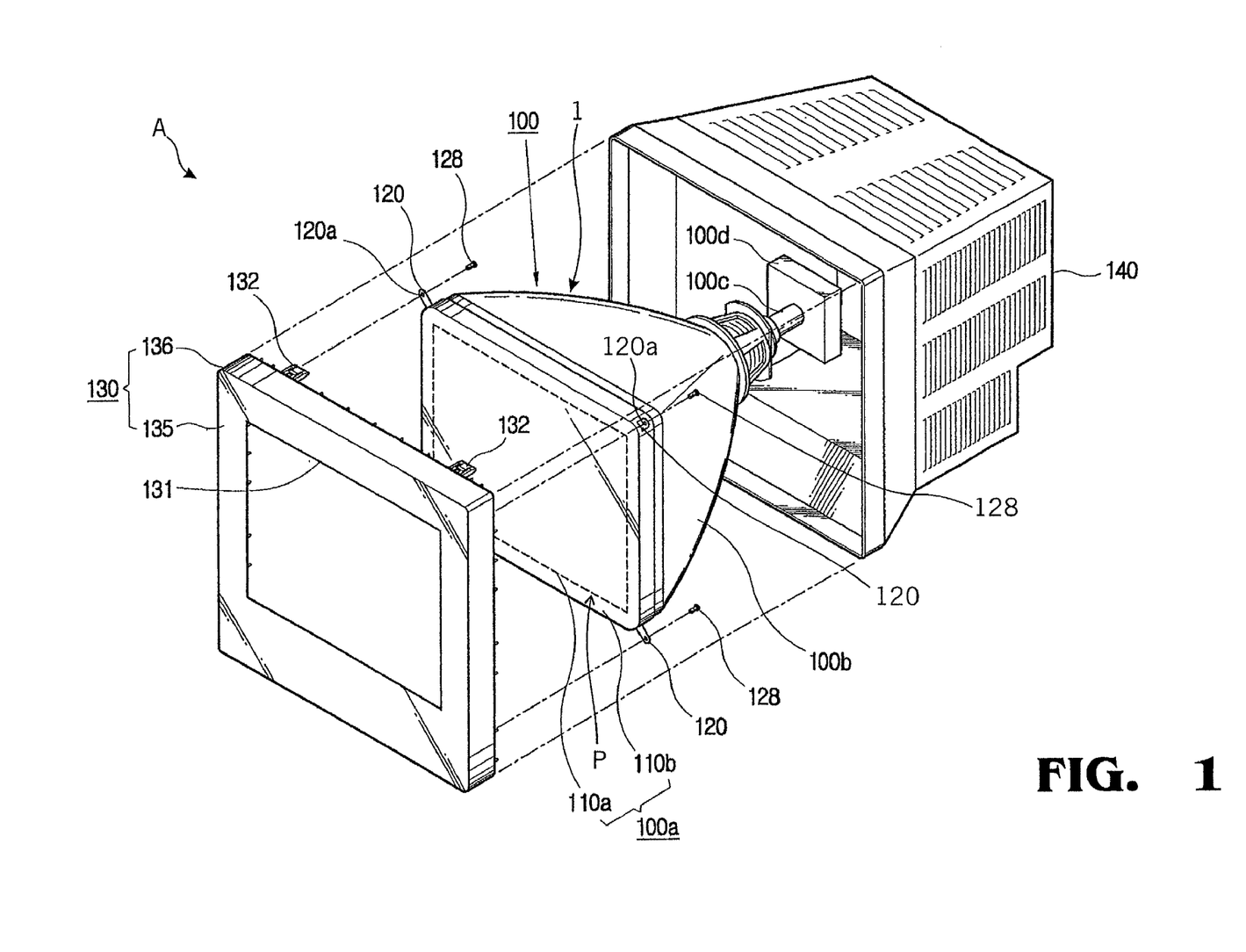
FIG. 1 is an exploded perspective view of a display apparatus according to a first embodiment of the present invention.
Figure 2:
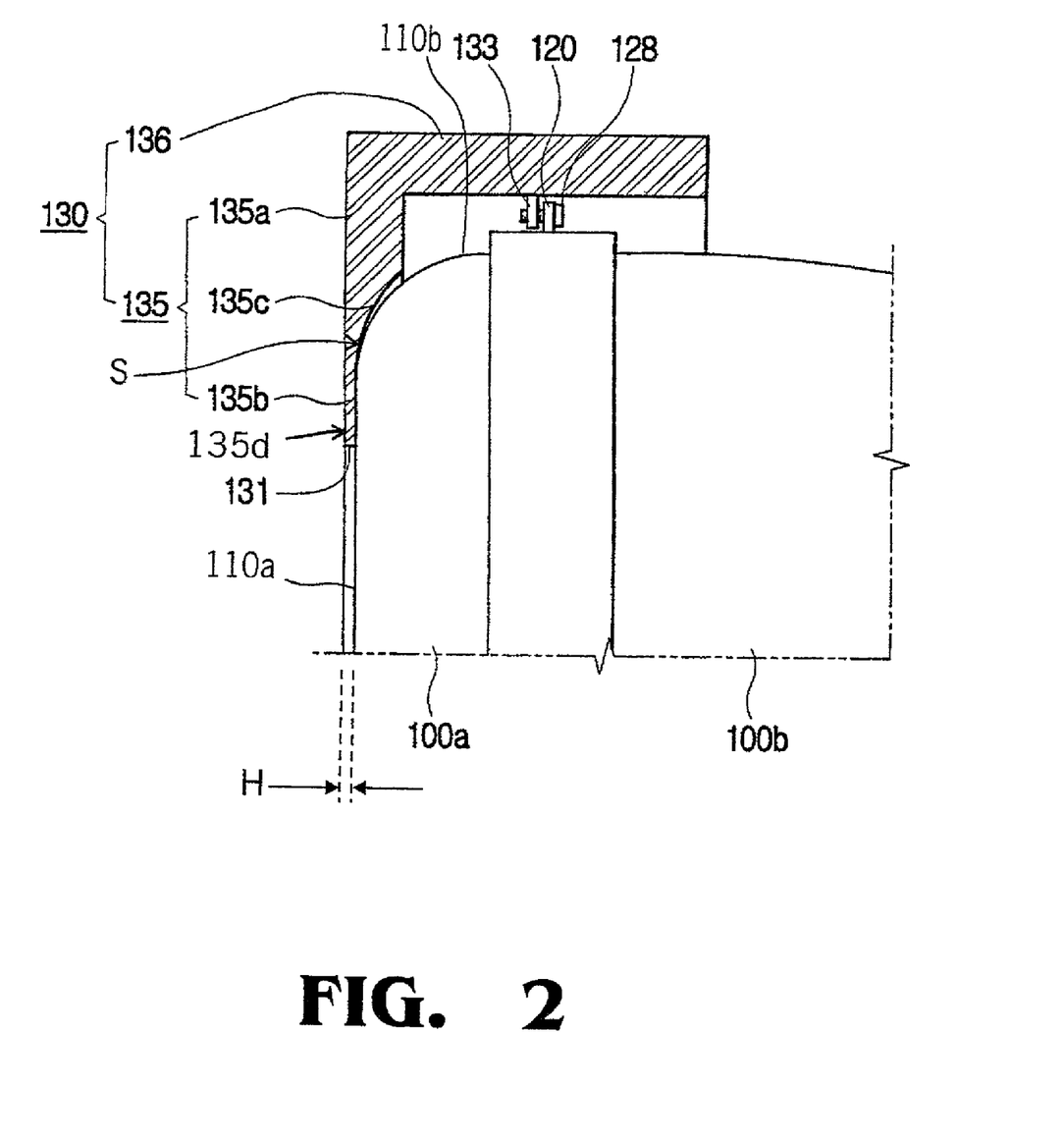
FIG. 2 is an enlarged sectional view showing an assembled state of the display apparatus of FIG. 1.

Referring now to FIGS. 1 and 2, as shown in FIG. 1, a display apparatus A according to a first embodiment of the present invention includes, as a display part 1, a cathode ray tube unit 100, and front and rear covers 130 and 140 being combined with each other and surrounding the cathode ray tube unit 100.

The cathode ray tube unit 100 includes a panel 100a fitted to the front cover 130, a funnel 100b combined with the panel 100a, an electron gun 100c inserted into a neck of the funnel 100b for emitting an electron beam onto the panel 100a, and a video unit 100d for transmitting a video signal.

The panel 100a has an effective face or display screen 110a on which a picture is displayed, and a supporting face 110b that extends along a circumference or perimeter P of the effective face or display screen 110a for supporting a contact part 135b of a front part 135 or of the front cover 130 (See FIG. 2).

At the front cover 130 is provided an opening 131 through which the effective face or display screen 110a is exposed to the outside of the display apparatus. The front cover 130 includes a front part 135 covering the supporting face 110b, and a skirt part 136 extending from each side of the front part 135 toward the rear cover 140 and being combined to the rear cover 140.

At the rear side of the front part 135 are provided snaps 132 to be combined to the rear cover 140, and female screw-bosses 133 (see FIG. 2) to be combined to the cathode ray tube unit 100. The female screw bosses 133 correspond to screw apertures 120a of combination parts 120 respectively provided at the outside of the cathode ray tube unit 120a. Thus, male screws 128 are respectively inserted into the screw apertures 120a and combined with the female screw-bosses 133, to thereby fasten the front cover 130 to the cathode ray tube unit 100.

As shown in FIG. 2, the front part 135 includes a connection part 135a bent in from the skirt part 136 with a predetermined thickness, and the contact part 135b extends from the connection part 135a and contacting with the supporting face 110b of the panel 100a. The connection part 135a has almost the same thickness as that of the skirt part 136. However, contrary to the thickness of the connection part 135a, the contact part 135b is relatively thin as illustrated in FIG. 2, thereby preventing a relatively large stair difference H from being created between the effective face 110a of the panel 100a and the front surface 135d of the front part 135, as is typically created or present in a conventional display apparatus.

Where the contact part 135b and the connection part 135a are integrally formed, there is a gradient part 135c of the front part 135 in which the thickness of the gradient part 135c is gradually decreased from the connection part 135a to the contact part 135b in order to prevent the relatively thin contact part 135b from being broken. Here, it is desirable that the gradient part 135c has a curved surface S corresponding to a curvature of the edge of the panel 100a rather than a rectilinear gradient in shape.

With the above-described configuration, the male screws 128 are respectively inserted into the screw apertures 120a of the connection parts 120 provided at the cathode ray tube unit 100 and combined with the female screw-bosses 133 provided at the rear side of the front part 135 of the front cover 130, and then the contact part 135b closely contacts with the supporting face 110b of the panel 100a. Thus, there is scarcely or minimally created any stair difference H between the display screen or effective face 110a of the panel 100a and the front surface 135d of the front part 135. Thereafter, the front cover 130 and the rear cover 140 are combined with each other by a suitable combining means, such as by the snaps 132.

As described above, according to the first embodiment of the present invention illustrated by display apparatus A, the contact part 135b contacting with and supporting the supporting face 110a of the panel 100a is thinner than the connection part 135a, so that the stair difference H between the effective face 110a of the panel 100a and the surface of front part 135 is minimized. As illustrated in FIG. 2, the front part 135 includes the relatively thin contact part 135b in relation to the skirt part 136, the contact part 135b contacting the supporting face 110b of the panel 100a, the contact part 135b positioning the front part 135 in relation to the effective face 110a of the panel 100a to minimize a stair difference H between the effective face 110a of the panel 100a and a front surface 135d of the front part 135. Thus, the panel 100a is further conspicuous for flatness in appearance.

Figure 3:
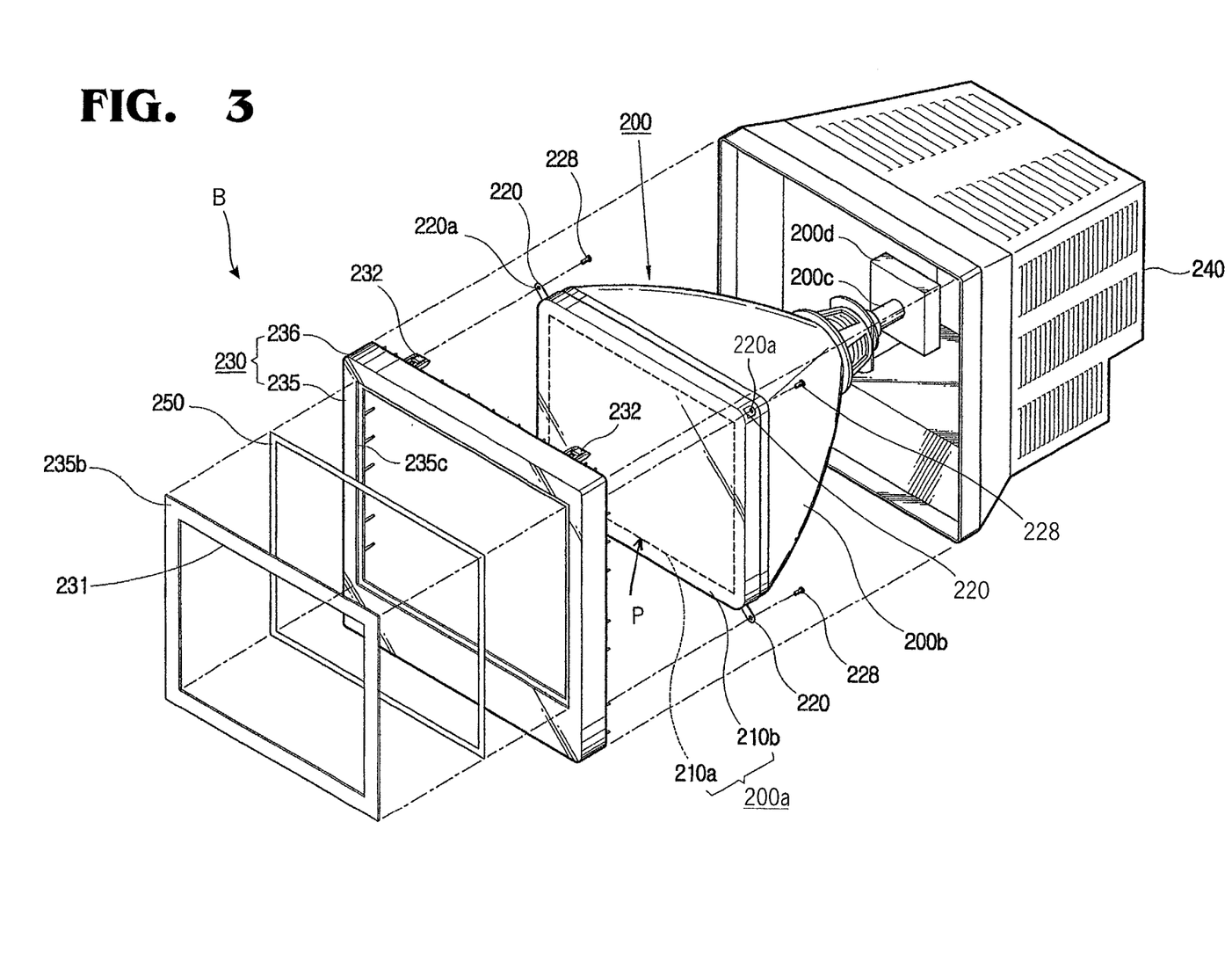
FIG. 3 is an exploded perspective view of a display apparatus according to a second embodiment of the present invention.
Figure 4:
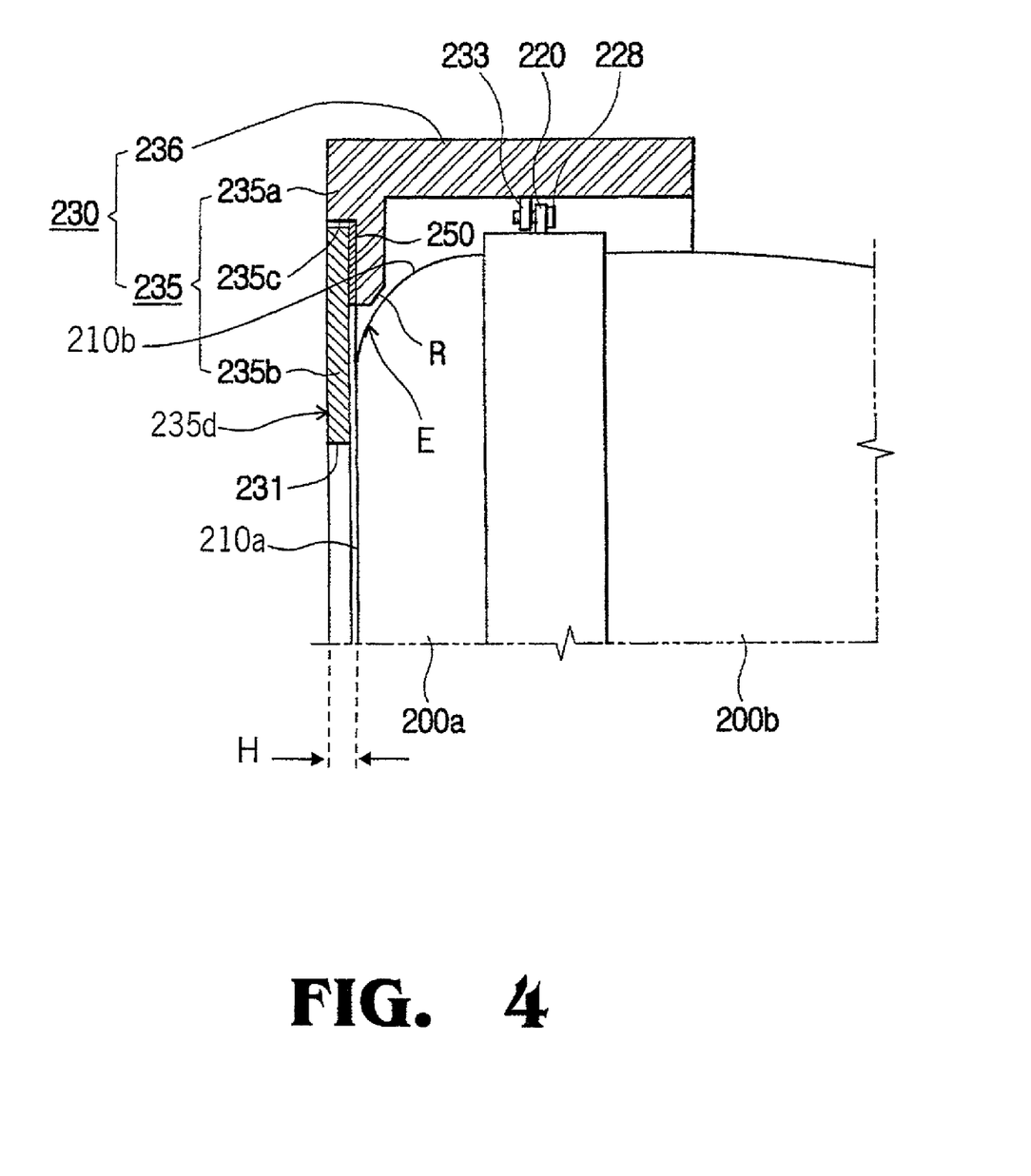
FIG. 4 is an enlarged sectional view showing an assembled state of the display apparatus of FIG. 3.

Referring now to FIGS. 3 and 4, as shown in FIG. 3, a display apparatus B according to a second embodiment of the present invention is illustrated and includes as a display part, a cathode ray tube unit 200, front cover 230 and rear cover 240 for being combined with each other and for surrounding the cathode ray tube unit 200.

As shown in FIG. 4, a front part 235 of front cover 230 includes a connection part 235a of a predetermined thickness bent inwardly from a skirt part 236, and a contact part 235b contacting with a supporting face 210b of a panel 200a and separable from the connection part 235a, the supporting face 210b extending along a circumference or perimeter P of an effective face 210a of the panel 200a. On the front of the connection part 235a is provided a recess part 235c of a predetermined depth. On the inside the connection part 235a, namely, on the back of the recess part 235c is formed a curved surface corresponding to a curvature of the edge E of the panel 200a.

It is desirable that the depth of the recess part 235c should be determined by the thickness of the connection part 235b. The thinner the thickness of the contact part 235b, the narrower is the stair difference H between the front surface 235d of front part 235 and an effective face 210 a of the panel 200a.

Combining with reference to FIGS. 3 and 4, the contact part 235b is coupled with the recess part 235c by means of a combining member 250. Herein, a bond, such as a both-sided or double-sided sided tape, a bolt, a hook, etc. can be employed as the combining member 250, the combining member illustrated in FIGS. 3 and 4 being a double-sided tape, for example. The inside of a loop of the contact part 235c forms an aperture or opening 231 through which the effective face or display screen 210a is exposed.

Further, because the contact part 235b is separable from the recess part 235c, various effects can be created for appearance of the display apparatus B. For instance, the contact part 235b can be made in various colors or can display various advertisement messages, for example, and, therefore, a user can select the contact part 235b according to a user's preference, thereby preventing or alleviating a user from possibly getting tired of a monochromatic display apparatus.

With the above-described configuration of the display apparatus B of FIGS. 3 and 4, the male screws 228 are respectively inserted into the screw apertures 220a of the connection parts 220 provided at the cathode ray tube unit 200 and combined with the female screw-bosses 233 provided at the rear side of the front part 235 of the front cover 230, and then the contact part 235b contacts with the recess part 235c of the connection part 235a by means of the combining member 250. Thus, there is scarcely created or minimally present any stair difference H between the effective face or display screen 220a of the panel 200a and the front surface 235d of the front part 235. Thereafter, the front cover 230 and the rear cover 240 are combined with each other by a suitable combining means, such as by snaps 232.

As described above, according to the second embodiment of the display apparatus B of the present invention of FIGS. 3 and 4, the contact part 235b that contacts with and supports the supporting face 210b of the panel 200a is thinner than the connection part 235a, so that the stair difference H between the effective face or display screen 210a of the panel 200a and the front surface 235d of the front part 235 is minimized. As illustrated in FIG. 4, the front part 235 includes the relatively thin contact part 235b in relation to the skirt part 236, the contact part 235b contacting the supporting face 210b of the panel 200a, the contact part 235b positioning the front part 235 in relation to the effective face 210a of the panel 200a to minimize a stair difference H between the effective face 210a of the panel 200a and a front surface 235d of the front part 235. Thus, the panel 200a is further conspicuous for flatness in appearance.

In the above descriptions of the display apparatus A and B of FIGS. 1 through 4, the present invention is applied to a panel for a cathode ray tube. However, the present invention can also be applied to an LCD panel.

Figure 5:
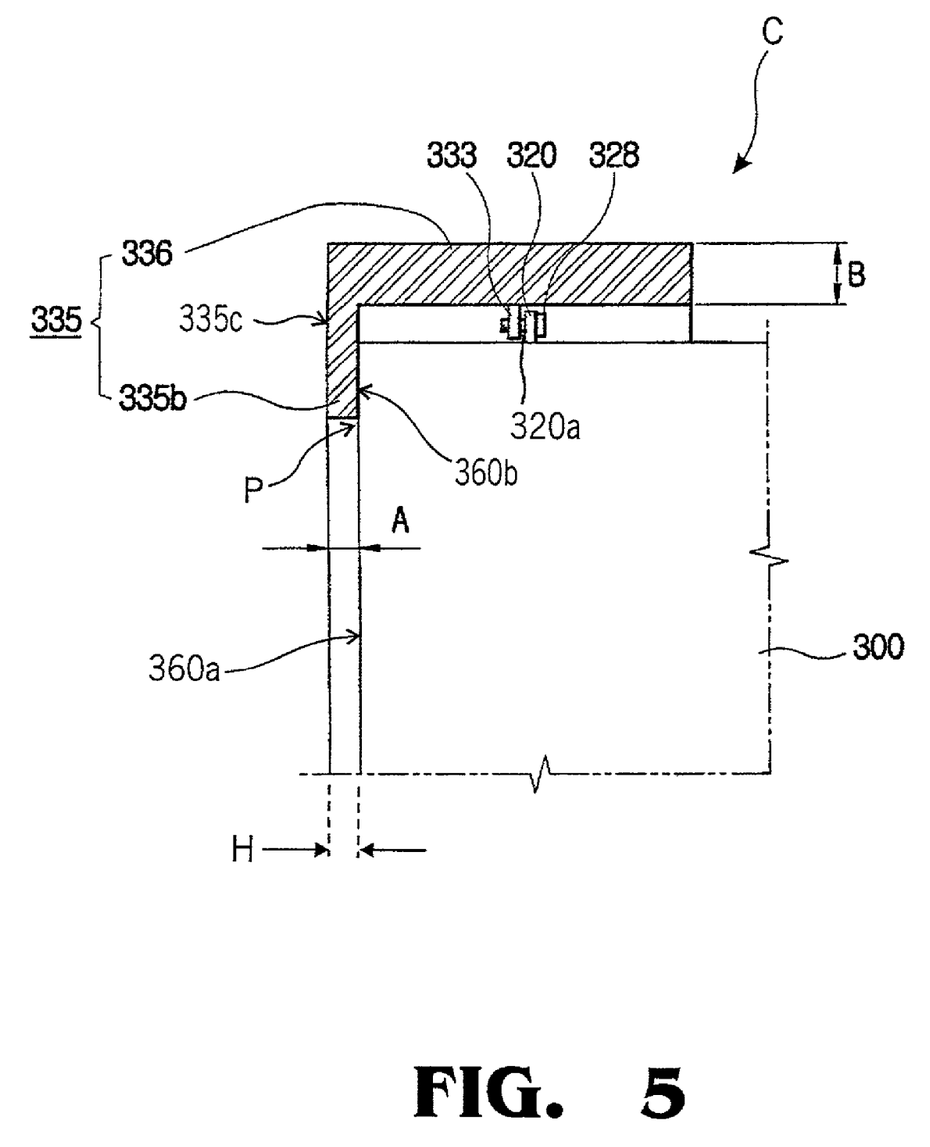
FIG. 5 is an enlarged cutaway view of a display apparatus according to a third embodiment of the present invention.

Referring now to FIG. 5, as shown in FIG. 5, a front part 335 of the display apparatus C according to a third embodiment of the present invention, in which an LCD panel 300 is employed as a display part, includes a contact part 335b bent inwardly from a skirt part 336 and contacting with the front of the LCD panel 300. A thickness A of the contact part 335b is thinner than a thickness B of the skirt part 336, so that a stair difference H generated between a surface of the LCD panel 300 and the front surface 335c of front part 335 can be minimized. As illustrated in FIG. 5, the front part 335 includes the relatively thin contact part 335b in relation to the skirt part 336, the contact part 335b contacting a supporting face portion 360b of the LCD panel 300, the contact part 335b positioning the front part 335 in relation to an effective face portion 360a of the LCD panel 300 to minimize a stair difference H between the effective face portion 360a of the LCD panel 300 and the front surface 335c of the front part 335, the supporting face portion 360b extending along a circumference or perimeter P of the effective face portion 360a of the LCD panel 300.

Also, as illustrated in FIG. 5, male screws 328 are respectively inserted into screw apertures 320a of the connection parts 320 provided at the LCD panel 300 and L are combined with female screw bosses 333 provided at a rear side of the front part 335 and then the contact part 335b closely contacts with the front of the LCD panel 300.

Figure 6:
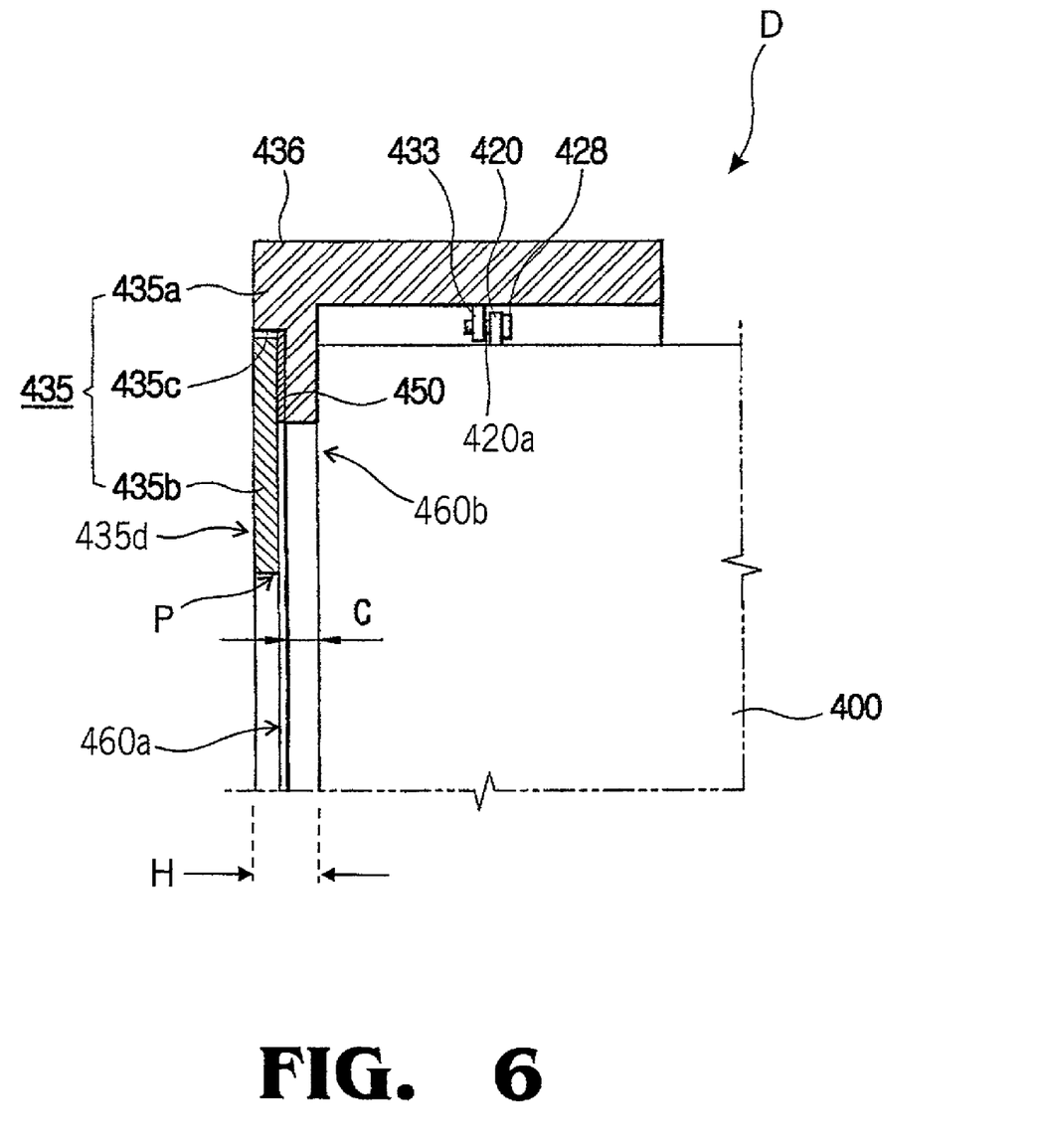
FIG. 6 is an enlarged sectional view of a display apparatus according to a fourth embodiment of the present invention.

Referring now to FIG. 6, as shown in FIG. 6, a front part 435 of the display apparatus D according to a fourth embodiment of the present invention, in which an LCD panel 400 is employed as a display part, includes a connection part 435a bent inwardly from a skirt part 436 and having a predetermined thickness, and a contact part 435b contacting with a supporting face of the LCD panel 400 and being separable from the connection part 435a. On the front of the connection part 435a is provided a recess part 435c with a predetermined depth.

In FIG. 6, a stair distance H between the LCD panel 400 and the front surface 435d of the front part 435 is shown significantly large. However, the stair distance H is narrow and is overdrawn in order to be easily understood, and thus it is actually desirable that the thickness C of the recess part 435c should be narrow.

It is desirable that the depth of the recess part 435c should be equal to the thickness of the contact part 435b as illustrated in FIG. 6. Further, the thinner the thickness of the contact part 435b, the narrower a stair difference H generated between the front surface 435d of the front part 435 and a surface of the LCD panel 400. The contact part 435b is coupled to the recess part 435c by means of a combining member 450. Herein, a bond, a both-sided or double-sided tape, a bolt, a hook, etc. can be employed as the combining member 450, with the combining member 450 in FIG. 6 being a double-sided tape, for example. As illustrated in FIG. 6, the front part 435 includes the relatively thin contact part 435b in relation to the skirt part 436, the contact part 435b contacting a supporting face portion 460b of the LCD panel 400, the contact part 435b positioning the front part 435 in relation to an effective face portion 460a of the LCD panel 400 to minimize a stair difference H between the effective face portion 460a of the LCD panel 400 and the front surface 435d of the front part 435, the supporting face portion 460b extending along a circumference or perimeter P of the effective face portion 460a of the LCD panel 400.

Also, as illustrated in FIG. 6, male screws 428 are respectively inserted into screw apertures 420a of the connection parts 420 provided at the LCD panel 400 and are combined with female screw bosses 433 provided at a rear side of the front part 435 and then the contact part 435b closely contacts with the front of the LCD panel 400.

In the display apparatus D of FIG. 6, as described above, the thinner the contact part 435b, the more the object of the present invention can be effectively achieved. Further, because the contact part 435b is separable from the recess part 435c, various effects can be created. For instance, as described above, the contact part 435b can be made in various colors or can display various advertisement massages and, therefore, a user can select the contact part 435*b* according to a user's preference, thereby preventing or alleviating a user from possibly getting tired of a monochromatic display apparatus.

As described in the first through fourth embodiments of FIGS. 1 through 6, according to the present invention, a stair difference H generated between a surface of a panel and a front part is minimized, so that a panel is further conspicuous for flatness in appearance. Further, even if a screen of the display apparatus is obliquely viewed, an area between an effective face or display screen of the panel and the front part can be shown. Therefore, as described above, the present invention provides a display apparatus in which a panel is further conspicuous for flatness in appearance.

Figure 7:
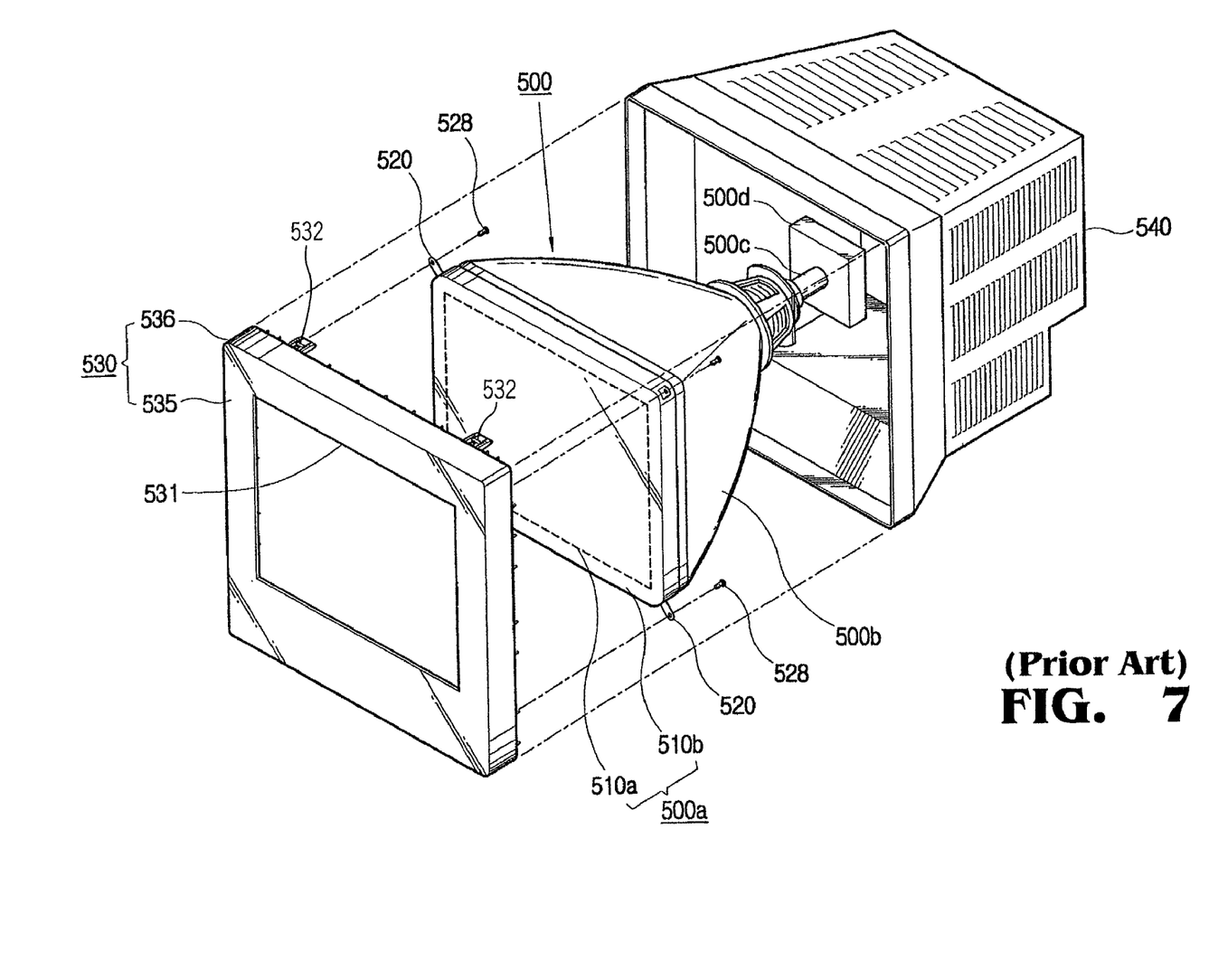
FIG. 7 is an exploded perspective view of a conventional display apparatus.
Figure 8:
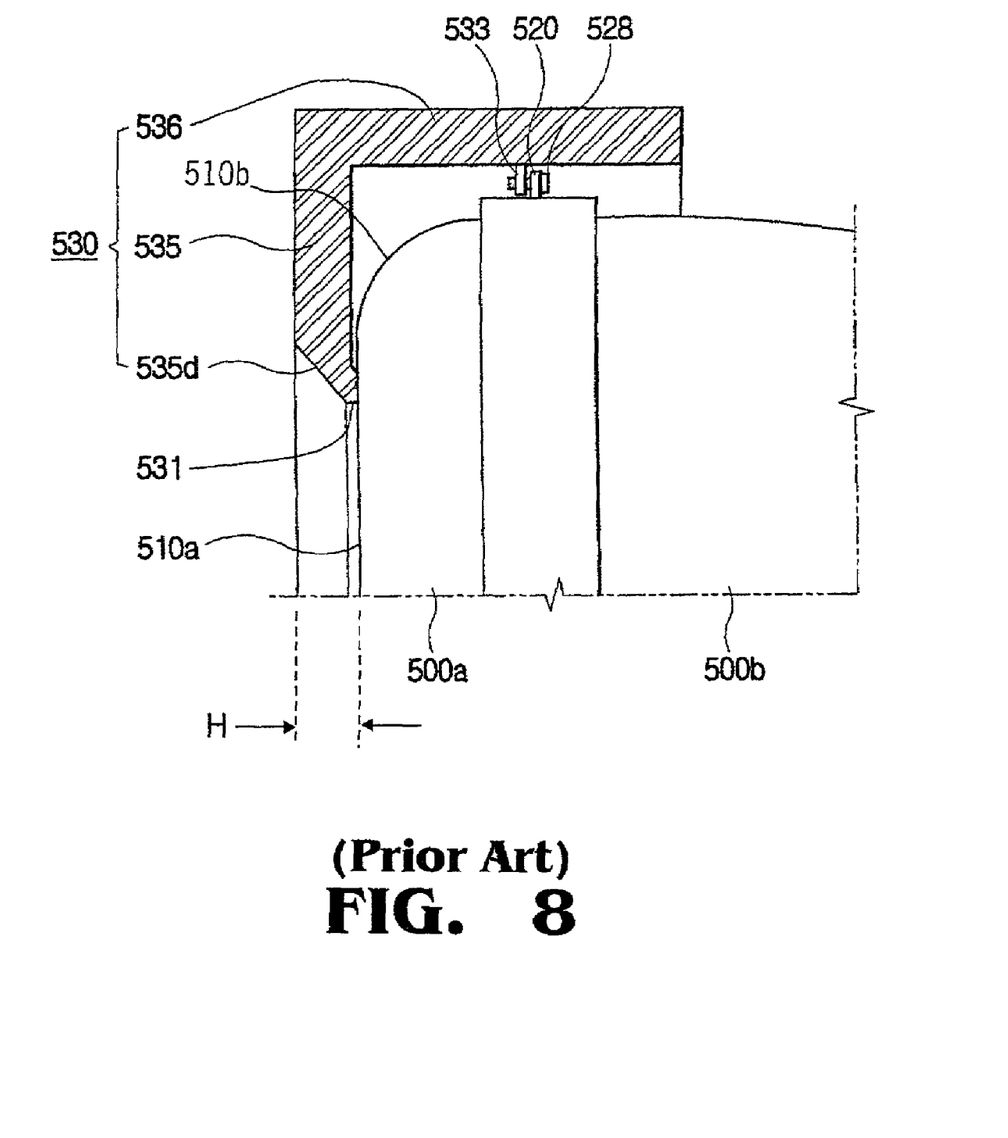
FIG. 8 is an enlarged sectional view showing an assembled state of the display apparatus of the FIG. 7.

Referring now to FIGS. 7 and 8, FIG. 7 is an exploded perspective view of a conventional display apparatus, while FIG. 8 is an enlarged sectional view showing an assembled state of the display apparatus of the FIG. 7. As shown in FIG. 7, the conventional display apparatus includes a cathode ray tube unit 500, front cover 530 and rear cover 540 for being combined with each other and for surrounding the cathode ray tube unit 500.

The cathode ray tube unit 500 includes a panel 500*a* fitted to the front cover 530, a funnel 500*b* combined with the panel 500*a*, an electron gun 500*c* inserted into a neck of the funnel 500*b* and emitting an electron beam onto the panel 500*a*, and a video unit 500*d* transmitting a video signal for display of an image. The panel 500*a* includes an effective face or display screen 510*a* on which a picture or image is displayed, and a supporting face 510*b* extending along a perimeter or circumference of the effective face 510*a* and supporting an end part of a bending part 535*d* (see FIG. 8) of the front cover 530. At the front cover 530 is provided an aperture or opening 531 through which the effective face or display screen 510*a* is exposed to the outside of the display apparatus. The front cover 530 includes a front part 535 covering the supporting face 510*b*, and a skirt part 536 extending from each side of the front part 535 toward the rear cover 540 and for being combined with the rear cover 540, such as by means of snaps 532.

As shown in FIG. 8, the front part 535 and the skirt part 536 are relatively thick and are almost equal to each other in thickness. At an end part of the front part 535 is provided bending part 535*d* inclined toward the panel 500*a*. When the front cover 530 is fastened on the cathode ray tube unit 500 by combining combination parts 520 provided at a circumference or perimeter of the panel 500*a* with female screw-bosses 533 provided at the front cover 530 by means of male screws 528, the bending part 535*d* prevents the front cover 530 from coming off the effective face or display screen 510*a* of the panel 500*a*. The end part of the bending part 535*d* is placed on the border between the effective face or display screen 510*a* and the supporting face 510*b*. The bending part 535*d* creates a relatively wide stair difference H between the front surface of the front part 535 and the effective face or display screen 510*a*, as illustrated in FIG. 8.

However, in the conventional display apparatus as illustrated in FIGS. 7 and 8, because not only the front part 535 and skirt part 536 forming the front cover 530 are relatively thick but also the bending part 535*d* creates a relatively large stair difference H between the front surface of the front part 535 and the surface of the panel 500*a*, it generates an illusion that the flatness of the panel 500*a* is degraded in appearance. Particularly, in the case that the display apparatus is manufactured with a planar panel not a spherical panel, the flatness of the panel appears degraded more significantly, because of the large stair difference H. Further, if a screen of the display apparatus is obliquely viewed, an area between an effective face 510*a* of the panel 500*a* and the front part 535 may not be shown. However, the front panel of a display apparatus according to the present invention, such as illustrated in the embodiments A through D of FIGS. 1 through 6, addresses such degradation in appearance and provides for a panel promoting flatness in appearance.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A display apparatus, comprising:
   a display part including a panel with an effective face on which a picture is displayed, and a supporting face extending along a perimeter of the effective face;
   a rear cover provided at a rear of the panel; and
   a front cover including an opening through which the effective face of the panel is exposed to outside of the display apparatus, a front part contacting with and being supported by the supporting face of the panel, and a skirt part extending from the front part toward the rear cover, the front part including a contact part in relation to the skirt part, the contact part being thinner than the skirt part, the contact part contacting the supporting face of the panel, the contact part positioning the front part in relation to the effective face of the panel to minimize a stair difference between the effective face of the panel and a front surface of the front part.

2. The display apparatus according to claim 1, further comprised of the front part including a connection part of a predetermined thickness connecting the contact part to the skirt part, the contact part being thinner than the predetermined thickness of the connection part.

3. The display apparatus according to claim 2, further comprised of the front part including a gradient part provided between the contact part and the connection part to integrally form the contact part and the connection part.

4. The display apparatus according to claim 3, further comprised of the gradient part including a curved surface corresponding to a curvature of an edge of the panel.

5. The display apparatus according to claim 2, further comprised of the contact part being separable from the connection part.

6. The display apparatus according to claim 5, further comprised of the connection part including a recess part formed at a front of the connection part in a direction toward the rear cover, with an inner edge of the recess part including a curved surface corresponding to a curvature of an edge of the panel.

7. The display apparatus according to claim 6, further comprising:
   a combining member for combining the contact part to the recess part.

8. The display apparatus according to claim 7, further comprised of the combining member comprising a double-sided tape for combining the contact part to the recess part.

9. The display apparatus according to claim 2, further comprised of the stair difference between the effective face of the panel and the front surface of the front part being minimized by the contact part being thinner than the predetermined thickness of the connection part.

10. A display apparatus, comprising:
a display part including a panel with an effective face on which a picture is displayed, and a supporting face extending along a perimeter of the effective face;
a front part including an opening through which the effective face of the panel is exposed to outside of the display apparatus, the front part contacting with and being supported by the supporting face of the panel; and
a skirt part extending from the front part for being combined with the display part, the front part including a contact part in relation to the skirt part, the contact part being thinner than the skirt part, the contact part contacting the supporting face of the panel, the contact part positioning the front part in relation to the effective face of the panel to minimize a stair difference between the effective face of the panel and a front surface of the front part.

11. The display apparatus according to claim 10, further comprised of the front part including a connection part of a predetermined thickness connecting the contact part to the skirt part, the contact part being thinner than the predetermined thickness of the connection part.

12. The display apparatus according to claim 11, further comprised of the front part including a gradient part provided between the contact part and the connection part to integrally form the contact part and the connection part.

13. The display apparatus according to claim 12, further comprised of the gradient part including a curved surface corresponding to a curvature of an edge of the panel.

14. The display apparatus according to claim 11, further comprised of the contact part being separable from the connection part.

15. The display apparatus according to claim 14, further comprised of the connection part including a recess part formed at a front of the connection part, with an inner edge of the recess part including a curved surface corresponding to a curvature of an edge of the panel.

16. The display apparatus according to claim 15, further comprising:
a combining member for combining the contact part to the recess part.

17. The display apparatus according to claim 16, further comprised of the combining member comprising a double-sided tape for combining the contact part to the recess part.

18. The display apparatus according to claim 11, further comprised of the stair difference between effective face of the panel and the front surface of the front part being minimized by the contact part being thinner than the predetermined thickness of the connection part.

19. The display apparatus according to claim 10, further comprised of the display apparatus comprising a cathode ray tube unit.

20. The display apparatus according to claim 10, further comprised of the display apparatus comprising a liquid crystal display panel.

21. A front cover for a display apparatus, comprising:
a front part for contacting with a supporting face of a panel of a display part, the display part including an effective face on which a picture is displayed, with the supporting face extending along a perimeter of the effective face; and
a skirt part extending from the front part for being combined with the display part, the front part including a contact part in relation to the skirt part, the contact part being thinner than the skirt part, the contact part for contacting the supporting face of the panel, the contact part for positioning the front part in relation to the effective face of the panel to minimize a stair difference between the effective face of the panel and a front surface of the front part.

22. The front cover for a display apparatus according to claim 21, further comprised of the front part including a connection part of a predetermined thickness connecting the contact part to the skirt part, the contact part being thinner than the predetermined thickness of the connection part.

23. The front cover for a display apparatus according to claim 22, further comprised of the stair difference between the effective face of the panel and the front surface of the front part being minimized by the contact part being thinner than the predetermined thickness of the connection part.

24. The front cover for a display apparatus according to claim 22, further comprised of the front part including a gradient part provided between the contact part and the connection part to integrally form the contact part and the connection part.

25. The front cover for a display apparatus according to claim 24, further comprised of the gradient part including a curved surface corresponding to a curvature of an edge of the panel.

26. The front cover for a display apparatus according to claim 22, further comprised of the contact part being separable from the connection part.

27. The front cover for a display apparatus according to claim 26, further comprised of the connection part including a recess part formed at a front of the connection part, with an inner edge of the recess part including a curved surface corresponding to a curvature of an edge of the panel.

28. The front cover for a display apparatus according to claim 27, further comprising:
a combining member for combining the contact part to the recess part.

29. The front cover for a display apparatus according to claim 28, further comprised of the combining member comprising a double-sided tape for combining the contact part to the recess part.

30. The front cover for a display apparatus according to claim 21, further comprised of the display apparatus comprising a cathode ray tube unit.

31. The display apparatus according to claim 21, further comprised of the display apparatus comprising a liquid crystal display panel.

* * * * *